United States Patent [19]

Scherzer et al.

[11] 3,867,307

[45] Feb. 18, 1975

[54] EXCHANGED FAUJASITE

[75] Inventors: Julius Scherzer, Baltimore; Edwin W. Albers, Annapolis, both of Md.

[73] Assignee: W. R. Grace & Co., New York, N.Y.

[22] Filed: Jan. 5, 1972

[21] Appl. No.: 215,652

Related U.S. Application Data

[63] Continuation-in-part of Ser. Nos. 67,284, Aug. 26, 1970, Pat. No. 3,676,368, and Ser. No. 884,693, Dec. 12, 1969, abandoned.

[52] U.S. Cl. .............................. 252/455 Z, 423/112
[51] Int. Cl. .............................................. B01j 11/40
[58] Field of Search .................. 252/455 Z; 423/112

[56] References Cited
UNITED STATES PATENTS

| | | | |
|---|---|---|---|
| 3,375,065 | 3/1968 | McDaniel et al. | 252/455 Z |
| 3,395,096 | 7/1968 | Gladrow et al. | 252/455 Z |
| 3,459,680 | 8/1969 | Plank et al. | 252/455 Z |
| 3,669,903 | 6/1972 | Bourguet et al. | 252/455 Z |
| 3,676,368 | 7/1972 | Scherzer et al. | 252/455 Z |

*Primary Examiner*—C. Dees
*Attorney, Agent, or Firm*—Joseph P. Nigon

[57] ABSTRACT

Synthetic faujasite is exchanged with a combination of rare earth and transition metal ions. The resulting exchanged faujasites possess high thermal and steam stabilities and find utility as hydrocarbon conversion catalysts.

3 Claims, No Drawings

EXCHANGED FAUJASITE

This application is a continuation-in-part of our applications Ser. No. 67,284, filed Aug. 26, 1970, now U.S. Pat. No. 3,676,368; and Ser. No. 884,693, filed Dec. 12, 1969, now abandoned.

The present invention relates to the preparation of metal exchanged faujasite, and more specifically to the preparation of catalytically active synthetic faujasite which has been exchanged with a combination of rare earth and transition metal ions.

It is generally known that alkali metal synthetic faujasites which have been exchanged with metal and/or hydrogen ions possess a high degree of activity as catalysts for the conversion of hydrocarbons. In particular, it has been found that rare earth ion exchanged faujasite constitutes a particularly effective catalyst or catalyst ingredient for the cracking of high molecular weight petroleum feedstocks to lower molecular weight derivatives such as gasoline and fuel oil.

To date many rare earth exchanged faujasite containing catalysts have been prepared which possess the thermal stability and activity characteristics necessary for the successful commercial cracking of hydrocarbons. However, most of these commercial catalyst compositions frequently lack the precise catalytic selectivity necessary to yield a product stream which comprises an optimum distribution of desirable end products. In other words, present day rare earth exchanged faujasites which constitute highly active catalysts frequently do not possess the selectivity characteristics which are desirable for optimum commercial operation at a given time.

It is therefore an object of the present invention to provide novel metal exchanged faujasites which find use as catalysts for the conversion of hydrocarbons.

It is a further object to provide a series of metal exchanged faujasites which may be employed as catalysts for the selective cracking of petroleum feedstocks to produce product streams which contain a large proportion of desired end products.

It is still another object to provide a method by which alkali metal synthetic faujasites may be exchanged with a combination of metal ions which alter the catalytic properties of the faujasite in the desired manner.

It is still a further object to provide a combination rare earth-transition metal ion exchange faujasite which contains a relatively low level of metal ions, but which possesses superior thermal and steam stability and desired catalytic characteristics.

These and still other objects of the present invention will become readily apparent to one skilled in the art from the following detailed description and specific examples.

Broadly, our invention contemplates synthetic faujasites which have been exchanged with a novel combination of rare earth and transition metal ions.

More specifically, we have found that an extremely stable and catalytically active form of faujasite may be obtained by exchanging alkali metal synthetic faujasite with rare earth and transition metals in the manner specified below:

1. A sodium faujasite having a silica to alumina ratio of about 2 to 6 and preferably from about 3 to 6 (NaY) is exchanged with a rare earth salt solution at a pH of from about 3 to 5 to obtain a faujasite having a rare earth content of 10 to 13% by weight $RE_2O_3$ and a sodium content of about 3 to 5% by weight $Na_2O$.

2. The rare earth exchanged faujasite is then calcined at a temperature of from about 400 to 600°C. for a period of 1 to 3 hours.

3. The calcined rare earth exchanged faujasite is then exchanged with an ammonium salt solution to reduce the $Na_2O$ content to below about 0.3% by weight.

4. The faujasite is then exchanged with a solution of transition metal ion to impart transition metal ion content of about 1 to 5% by weight and preferably 1 to 2.5% by weight $M_{2/n}O$ wherein M represents a transition metal ion selected from the group consisting of zinc, cadium, thallium, zirconium, manganese, cobalt, nickel and copper, and $n$ is the valence of M.

The mixed rare earth transition metal exchanged faujasites prepared by way of the above described procedure possess high thermal and steam stabilities and find use as catalysts for the catalytic conversion of hydrocarbons.

The alkali metal faujasite used to prepare the presently contemplated mixed metal exchanged faujasites possesses a silica to alumina ratio ranging from about 2 to as high as 6. Typically, the faujasite will be of the type X of type Y variety which is readily obtainable from several commercial sources. Preferably however, the faujasite used to prepare our compositions will possess a silica to alumina ratio in excess of 3 and preferably from about 4 to about 6.

The first step used to prepare our novel compositions involves an exchange with rare earth salt solution. The rare earth salt solution is preferably maintained at a pH of from about 3.0 to about 3.5 during the exchange procedure. This pH is obtained by the addition of mineral acid while the exchange is taking place. The rare earth salt solution is prepared using commercially available rare earth salts which are generally a mixture of lanthanum, cerium and minor quantities of other rare earths. Preferably rare earth chlorides are used. However, it is also contemplated that sulfates and nitrates may be utilized if desired.

The rare earth exchange solution, preferably contains from about 0.1 to about 0.4 moles of rare earth ion salt per liter. The exchange is conducted preferably at a temperature of from about 80 to 105°C. over a period of from about 0.1 to about 3 hours. Generally it is found that during the aforementioned exchange procedure the alkali metal ion content of the faujasite is reduced from an initial level of about 12 to 15 percent to a lower desired level of from about 3 to 5 percent expressed as alkali metal oxide and more frequently as the $Na_2O$ content.

Subsequent to rare earth exchange the faujasite is subjected to a calcination or heating which is conducted at a temperature of from about 400 to 600°C. over a period of 1 to 3 hours. This calcination may be conducted under inert atmosphere in the presence of air if desired. This calcination step generally performs the function of fixing the rare earth ion in the faujasite structure, and furthermore serves the function of activating or loosening the residual alkali metal ions remaining in the faujasite structure after the initial rare earth exchange.

Subsequent to calcination the calcined rare earth exchanged faujasite is subjected to a washing or ion exchange step wherein the faujasite is contacted with an aqueous solution of ammonium salt. Preferably the ammonium salt used is ammonium sulfate or ammonium chloride, however, other ammonium salts such as carbonate or nitrate may be utilized.

The ammonium salt exchange is preferably conducted using a solution which contains from about 100 to 150 grams ammonium salt per liter of solution and from about 10 to 20 grams of solution per gram of zeolite exchange is utilized. Ordinarily, the exchange with ammonium salt solution is conducted to lower the residual alkali metal content of the faujasite to below about 0.3 percent by weight measured as $Na_2O$. In order to obtain this low soda level a succession of exchanges, normally 2 or 3 exchanges with ammonium salt solution, is required.

After exchanging the calcined rare earth exchanged faujasite with ammonium salt solution, the faujasite is exchanged with a solution of transition metal ion. This exchange with transition metal ion is conducted using an aqueous solution of the desired metal ion which will impart a metal content of from about 1 to 5% by weight measured as $M_{2/n}O$. Ordinarily, transition metal salt solutions containing from about 0.02 to 0.2 moles of metal ion salt per liter of solution are utilized. From about 3 to 6 grams of this solution per gram of zeolite will generally be sufficient to impart the desired metal ion concentration. The transition metals are preferably utilized in the form of their chlorides, sulfates or nitrates. However, it is contemplated that other soluble salts or complexes thereof may also be utilized. Ordinarily, a single exchange with transition metal ion is sufficient to impart the desired metal ion concentration. The time required for the exchange will range from about 0.5 to 2 hours and preferably are conducted at a temperature of from about 75 to 105° C.

The mixed metal ion exchange faujasites obtained by the practice of the present method will possess a surface area on the order of about 750 to 900 $m^2/g$. The thermal stability of these materials is generally equal to or better than faujasites which have been fully exchanged with metal ions, and furthermore, the steam stability of these materials is considered to be very good. Typically, the present mixed rare earth transition metal ion faujasites will retain up to 80 percent of their initial surface areas after being heated to a temperature of 900°C. for 1 to 2 hours.

In addition to possessing excellent thermal and steam stability the present rare earth transition metal exhanged faujasites possess a high degree of catalytic activity, and particularly a high degree of activity for the catalytic cracking of hydrocarbons. These exchanged faujasites may be utilized as a cracking catalyst per se when formed into suitable particles. Typically, our products may be formed into microspheres having an average particle size ranging from 50 to 200 microns or they may be pelleted into particles having sizes up to one-fourth inch in diameter. In one particularly preferred utilization of our rare earth transition metal exchanged faujasites, the faujasite is combined with an inorganic oxide matrix, preferably an amorphous silica alumina hydrogel. Furthermore, the presently contemplated faujasites may be combined with a matrix which comprises a mixture of amorphous silica-alumina hydrogel and various amounts of clay. The amount of our faujasite combined with a matrix will generally range from about 5 to about 95% by weight of the finished composition. The method by which the presently contemplated faujasites are admixed with the matrix are well known to those skilled in the art and include physical blends with matrix components, as well as mixtures wherein the faujasite is added during the preparation of the silica-alumina hydrogel to obtain a catalytic particle wherein the faujasite is embedded in a continuous matrix of amorphous hydrogel component. Silica alumina hydrogels containing from about 13 up to as much as 30% by weight alumina are particularly preferred. In addition, when clay is included in the matrix component, catalysts containing up to 40 and as much as 50% by weight clay are found to possess particularly good catalytic properties.

Having described the basic aspects of the present invention the following examples are given to illustrate specific embodiments thereof.

EXAMPLE I

Preparation and Properties of Mixed Rare Earth-Cobalt Exchanged Faujasite Type Sieves (RE—Co—Y Sieves)

RE-Co-Y sieves were prepared from NaY by consecutive rare earth, ammonium and cobalt exchange. Sieves with similar rare earth content ($RE_2O_3$ 12%) and variable cobalt content (between 0.7 and 2.2% CoO) were prepared and their catalytic properties tested. Commercial rare earth-chloride solution (60 wt.% rare earth chloride hydrate), cobalt chloride and ammonium sulfate were used in the exchange process.

The NaY sieve had a silica/alumina ratio of 4.8.

1. In a typical example, 50 g (dry basis) of thoroughly washed commercial NaY sieve was slurried in 150 ml of water. The sieve slurry was added under stirring to a rare earth chloride solution, prepared by diluting 15 ml commercial rare earth chloride solution with 100 ml of water. After blending the sieve into the rare earth chloride solution, the pH of the slurry was adjusted to 3.5 with diluted hydrochloric acid. It was heated for 1 hour at boiling under stirring, filtered, washed chloride free and calcined at 540°C for 3 hours in a muffle furnace. The calcined sieve was treated several times at boiling with a 10 wt.% ammonium sulfate solution, until the sodium content of the sieve was reduced below 0.3% $Na_2O$. The sieve was finally washed sulfate free and dried at 110°C for 2 hours. Thus, a RE—$NH_4$—Y sieve was obtained. To prepare a RE—Co—Y sieve, 25 g (dry basis) of RE—$NH_4$—Y was slurried in 60 ml of water. A cobalt chloride solution was prepared by dissolving 2.8 g $CoCl_2·6H_2O$ in 40 ml of water. The sieve slurry was added to the cobalt chloride solution under stirring and heated to boiling for 45 minutes. The slurry was filtered, washed chloride free and dried at 110°C for 2 hours. Composition and thermal stability data for the material prepared are given in Table I (see sample A-2).

2. In this example a RE—Co—Y sieve was prepared by the same procedure as sample A-1, the only difference being the use of 2.1 g of cobalt chloride hydrate. Composition and thermal data for this material are shown in Table I (see sample A-2).

3. A RE—Co—Y sieve was prepared by the procedure described for sample A-1, except for the use of 1.4 g of $CoCl_2.6H_2O$ in the cobalt exchange process. Composition and stability data for the material obtained are given in Table I (see sample A-3).

4. Another RE—Co—Y sieve was prepared by the procedure described for Sample A-1, except for the use of 0.7 g $CoCl_2.6H_2O$ for the cobalt exchange. Composition and stability data are given in Table I (see sample A-4).

The thermal and steam stability data for RE—Co—Y sieves clearly indicate that for a practically constant rare earth level, the stability of the sieves decreases with increasing cobalt content.

EXAMPLE II

Preparation and Properties of Mixed Rare Earth-Manganese Exchanged Faujasite Type Sieves (RE—Mn—Y-Sieves)

The RE—Mn—Y sieves were prepared by the same general technique as the RE—Co—Y sieves of Example I. Commercial NaY sieve, ammonium sulfate and manganese chloride ($MnCl_2 \cdot 4H_2O$) were used in the exchange process.

1. In a typical example, a RE—$NH_4$—Y sieve was first prepared as previously described (see preparation of RE—Co—Y, sample A-1). 30 g (dry basis) of RE—$NH_4$—Y was slurried in 70 ml of water and then added to a solution of 1.5 g $MnCl_2 \cdot 4H_2O$ dissolved in 50 ml of water. The resulting slurry was heated for one hour at boiling with stirring, then filtered, washed chloride free and dried at 110°C for 2 hours. Composition and stability data for the resulting material are given in Table I (see sample B-1).

2. Another RE—Mn—Y sieve was prepared in a similar way, except for using 4.5 g $MnCl_2 \cdot 4H_2O$ in the exchange processes. Composition and stability data are shown in Table I (see sample B-2).

3. A RE—Mn—Y sieve was prepared by the same procedure, except for using 7.5 g $MnCl_2 \cdot 4H_2O$ for the exchange. Composition and stability data are given in Table I (see sample B-3).

As in the case of RE—Co—Y sieve, the stability of RE—Mn—Y sieves with practically constant rare earth content and variable amounts of manganese decreases with increasing manganese content.

EXAMPLE III

Preparation and Properties of Mixed Rare Earth-Zinc Exchanged Faujasite Type Sieves (RE—Zn—Y Sieves)

RE—Zn—Y sieves were prepared from NaY by consecutive rare earth, ammonium and zinc exchange. Commercial rare earth chloride solution, ammonium sulfate and zinc sulfate were used for the exchange. The sieves prepared contained between 15 and 16% $RE_2O_3$ and 0.6 to 3.5% ZnO.

1. In a typical example, a RE—$NH_4$—Y sieve was prepared as previously described (see preparation of RE—Co—Y sieve, Sample A-1), except for using 20cc of rare earth chloride solution for the rare earth exchange. 25g (dry basis) of the RE—$NH_4$—Y sieve prepared was slurried in 100 ml of water and added to a solution containing 1.0 g $ZnSo_4 \cdot 7H_2O$ dissolved in 50 ml of water. The pH of the resulting slurry was adjusted to 3.5 and then heated at boiling for 1 hour. After the exchange the material was filtered, washed and dried at 110°C for 2 hours. Composition and stability data are given in Table I (see sample C-1).

2. Another RE—Zn—Y sieve was prepared by an identical procedure, except for using 2 g $ZnSo_4 \cdot 7H_2O$ in the exchange process. For composition and stability see Table I (sample C-2).

EXAMPLE IV

Preparation and Properties of Mixed Rare Earth-Thallium Exchanged Faujasite Type Sieves (RE-Tl-Y)

A series of RE—Tl—Y sieves has been prepared by the consecutive exchange technique. The preparations involved the following steps: (1) rare earth exchange of NaY, resulting in a sieve with approximately 12–13% $RE_2O_3$; (2) calcination in air at 1000°F for 2 hours; (3) ammonium exchange of the remaining sodium ions to less than 0.3% $Na_2O$; (4) thallium exchange of ammonium ions in the sieve with variable amounts of Tl(I) ions. Commercial, lanthanum rich rare earth chloride solutions, and thallium (I) nitrate were used in the exchange process.

1. In a typical example, a RE—$NH_4$—Y sieve was prepared first as previously described (see preparation of RE—Co—Y, sample A-1). 25 g dry basis of the RE—$NH_4$—Y sieve prepared was slurried in 100 ml of water and then blended into a solution of 0.6 g $TlNO_3$ dissolved in 50 ml of water. The slurry was heated at boiling for one hour, filtered, washed with D.I. water and dried at 110°C for 2 hours. For composition and stability data see Table I, sample D-1.

2. In another example, a RE—Tl—Y sieve was prepared by an identical procedure, except for the use of 0.8 g $TlNO_3$ for the thallium exchange. Composition and stability data are shown in Table I (see sample D-2).

3. Another RE—Tl—Y sieve was prepared by a similar procedure except for the use of 1.0 g $TlNO_3$ in the exchange process. Composition and stability data are given in Table I (see sample D-3).

Table I

Composition, Thermal and Steam Stability Data For RE-M-Y Sieves

Starting Material: commercial NaY sieve (silica/alumina ratio=4.8)

| Sample No. | Sieve Prepared | Chemical Composition | | | Thermal Profile (SA in $m^2$/g at °F-2 hrs) | | | Steam Stability 1500°-2 hr. 100% Steam Std. =100(*) |
|---|---|---|---|---|---|---|---|---|
| | | %$RE_2O_3$ | %$MxO_y$(**) | %$Na_2O$ | 1000 | 1600 | 1650 | |
| A-1 | RE-Co-Y | 12.3 | 2.21 | 0.2 | 813 | 708 | 72 | 81 |
| A-2 | do. | 12.3 | 1.75 | 0.2 | 815 | 781 | 84 | 86 |
| A-3 | do. | 12.0 | 1.30 | 0.3 | 790 | 705 | 329 | 90 |
| A-4 | do. | 12.1 | 0.71 | 0.2 | 865 | 745 | 514 | 93 |
| B-1 | RE-Mn-Y | 12.4 | 0.58 | 0.2 | 799 | 753 | 644 | 95 |
| B-2 | do. | 12.3 | 1.68 | 0.2 | 792 | 738 | 632 | 80 |
| B-3 | do. | 12.3 | 3.69 | 0.2 | 748 | 702 | 618 | 71 |
| C-1 | RE-Zn-Y | 16.1 | 1.31 | 0.2 | 775 | 740 | 645 | 93 |
| C-2 | do. | 15.6 | 2.36 | 0.2 | 772 | 753 | 588 | 73 |
| D-1 | RE-Tl-Y | 12.8 | 2.03 | 0.2 | 792 | 696 | 437 | 100 |
| D-2 | do. | 12.7 | 2.60 | 0.2 | 625 | 615 | 370 | 84 |
| D-3 | do. | 11.9 | 3.51 | 0.2 | 693 | 683 | 403 | 77 |

Table I—Continued (*) "Standard" is a calcined rare earth exchanged Y sieve. Steam stabilities are measured by surface area retention relative to the Standard.
(**) The cobalt content is expressed in wt% CoO, the manganese content in %MnO, the zinc content in %ZnO, and the thallium content in %Tl$_2$O. The surface areas were determined after calculation in air (in the case of RE-I-Y, part of the Tl(I) ions were thus oxidized to Tl(III)).

EXAMPLE V

Catalytic Evaluation of Rare Earth-Transition Metal Faujasite Type Sieves as Promoters in Pertroleum Cracking The rare earth-transition metal faujasite type zeolites containing 10 to 13% RE$_2$O$_3$ and no more than 4 to 5% transition metal oxide, are highly active catalytic promoters for petroleum cracking catalysts. The type and amount of transition metal in the sieve affects primarily the selectivity of the catalyst, increasing or decreasing the yield in different products in the cracking process. For illustration, examples are given for each type of sieve prepared when used as a promoter in petroleum cracking catalysts. The tests were carried out on a micro-activity unit. The sieves were tested aftet steam deactivation at 1350°F for 8 hours. The results obtained are summarized in Table II. These results are compared to those of a Standard (CREY), containing a commercial/rare earth-Y sieve.

number improving i-C$_4$ (iso-butane) yield is also higher than that of CREY. The coke selectivity of most RE—M—Y sieves is comparable or better than that of CREY.

The above examples clearly illustrate that useful catalytic compositions may be obtained by utilizing the mixed transition rare earth metal ion exchanged faujasite of the present invention.

We claim:
1. A mixed rare earth-transition metal exchanged faujasite which contains 10 to 13% by weight rare earth ion expressed as RE$_2$O$_3$; 0.5 to 5% by weight transition metal ion expressed as M$_{2/n}$O wherein M is selected from the group consisting of zinc, cadmium, thallium, zirconium, manganese, cobalt, nickel, and copper and n is the valence of M; and less than 3% by weight alkali metal measured as Na$_2$O prepared by the process which comprises:
    a. exchanging a sodium faujasite with rare earth metal ion solution to impart the RE$_2$O$_3$ content;
    b. calcining the faujasite at a temperature of from about 400° to 600°C;
    c. exchanging the faujasite with ammonium ion solution to lower the Na$_2$O content; and
    d. exchanging the faujasite with a solution of transition metal ion to impart the M$_2$O content.

2. The product of claim 1 wherein the rare earth exchange step (a) is conducted at a pH of from about 3 to 3.5.

3. The product of claim 1 wherein the transition metal ion content is 1 to 2.5% by weight.

Table II

Micro-Activity Data for RE-M-Y Promoted Catalysts After Steaming (M Co, Zn, Mn, Tl)

Test Conditions: Promoter 10 wt.% blend in semi-synthetic matrix *; 900°F/16 WHSV; steamed at 1350°F for 8 hrs. (15 psig steam);
Feed: West Texas Devonian Gas Oil, 500–800°F cut.

| Sample Type | RE-Co-Y | RE-Co-Y | RE-Mn-Y | RE-Mn-Y | RE-Zn-Y | RE-Zn-Y | RE-Tl-Y | RE-Tl-Y | CREY |
|---|---|---|---|---|---|---|---|---|---|
| Sample No. | A-3 | A-1 | B-1 | B-2 | C-1 | C-2 | D-1 | D-3 | Stand. |
| Promoter Comp. | | | | | | | | | |
| %RE$_2$O$_3$ | 12.0 | 12.3 | 12.3 | 12.3 | 16.1 | 15.6 | 12.8 | 11.9 | 17.9 |
| %M$_x$O$_y$ | 1.30 | 2.21 | 0.58 | 1.68 | 1.31 | 2.36 | 2.03 | 3.51 | — |
| %Na$_2$O | 0.3 | 0.2 | 0.2 | 0.2 | 0.2 | 0.2 | 0.2 | 0.2 | 0.1 |
| Conversion, V% | 71 | 75 | 71 | 72 | 71 | 70 | 75 | 70 | 70 |
| H$_2$, W% | 0.03 | 0.04 | 0.03 | 0.04 | 0.04 | 0.11 | 0.03 | 0.04 | 0.03 |
| C$_3$=, V% | 6.1 | 6.6 | 6.5 | 6.2 | 6.9 | 6.2 | 5.2 | 6.4 | 5.3 |
| C$_3$ tot., V% | 7.4 | 8.1 | 8.0 | 7.6 | 8.8 | 8.3 | 8.6 | 8.0 | 6.5 |
| C$_4$=, V% | 3.7 | 3.9 | 3.8 | 3.7 | 4.6 | 3.3 | 3.2 | 4.2 | 3.3 |
| i-C$_4$, V% | 7.0 | 7.5 | 7.6 | 7.0 | 7.5 | 7.3 | 7.3 | 7.7 | 6.1 |
| C$_4$ tot., V% | 11.9 | 12.8 | 12.8 | 12.0 | 13.5 | 12.1 | 11.8 | 13.3 | 10.5 |
| C$_5$+gaso., V% | 60.3 | 64.9 | 59.6 | 61.4 | 59.2 | 56.6 | 63.3 | 58.3 | 58.9 |
| C$_4$+gaso., V% | 72.2 | 77.7 | 72.4 | 73.3 | 72.6 | 68.6 | 75.1 | 71.6 | 69.5 |
| C on cat., W% | 0.4 | 0.7 | 0.3 | 0.3 | 0.4 | 0.6 | 0.4 | 0.4 | 0.4 |
| C on feed, W% | 2.25 | 2.3 | 1.9 | 1.8 | 2.4 | 3.3 | 2.5 | 2.2 | 2.5 |
| C$_5$+gaso./conv., V/W | 0.85 | 0.87 | 0.84 | 0.86 | 0.83 | 0.81 | 0.84 | 0.84 | 0.85 |
| C$_5$+gaso./coke, V/W | 26.8 | 28.1 | 30.8 | 33.9 | 24.0 | 17.2 | 30.3 | 32.3 | 23.1 |
| Conv./coke, V/W | 31.6 | 32.6 | 36.8 | 39.6 | 28.9 | 21.2 | 25.5 | 27.1 | 27.1 |

* Matrix Comprised: 40 wt.% kaolin and 60 wt.% synthetic silica-alumina mixture. The synthetic mixture consists of 75 wt.% silica and 25 wt.% alumina.

The data in Table II indicate that all the tested promoters have an activity, similar or better than the commercial promoter (CREY), in spite of the significantly lower rare earth content of RE—M—Y sieves. Some of them (samples A-1 and D-1) show a substantial improvement in activity over CREY. The C$_5$+ gasoline selectivity of the RE—M—Y promoted catalysts is also similar or better than that of CREY. In the case of samples A-1 and D-1 a significant improvement in C$_5$ gasoline selectivity is achieved. The yield in C$_3$ and C$_4$ olefins is in all cases higher than that of CREY. The octane

* * * * *